(No Model.)
E. D. BEAN.
POLICE CHAIN NIPPERS.
No. 298,158. Patented May 6, 1884.
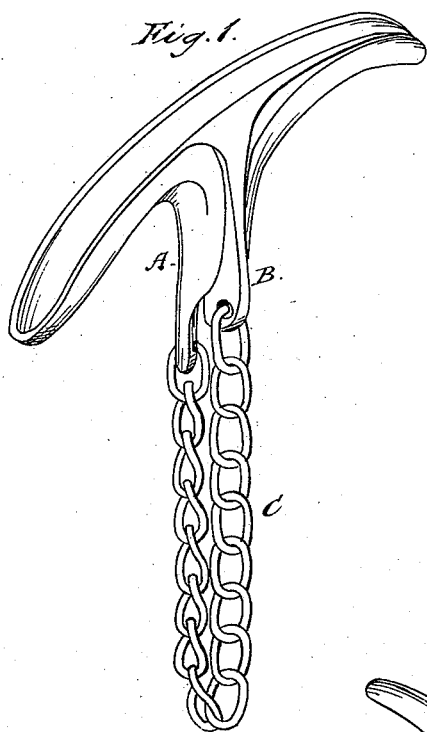
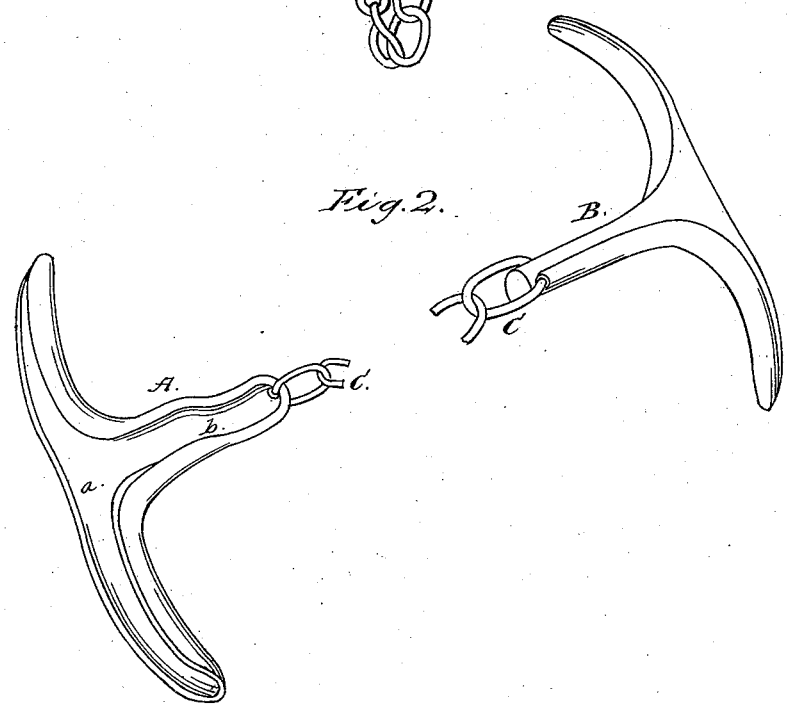
Attest:
F. W. Howard
Edward G. Siggers
Inventor:
Edward D. Bean,
by W. H. Babcock
Attorney.

United States Patent Office.

EDWARD DAVIS BEAN, OF CHELSEA, MASSACHUSETTS.

POLICE CHAIN NIPPERS.

SPECIFICATION forming part of Letters Patent No. 298,158, dated May 6, 1884.

Application filed August 29, 1882. (No model.)

*To all whom it may concern:*

Be it known that I, EDWARD DAVIS BEAN, a citizen of the United States, residing at Chelsea, in the county of Suffolk and State of Massachusetts, have invented certain new and useful Improvements in Police Chain Nippers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to policemen's nippers; and it consists in a pair of nippers constructed with two handles, one of which is recessed to receive the other, whereby said handles are interlocked to brace said handles and to prevent the flesh of the officer's hand from being pinched between them.

The drawings accompanying this specification represent, in Figure 1, an isometric view of a pair of nippers in a closed state containing my improvements, while Fig. 2 represents the same in an open or extended state upon a flat plane.

In said drawings, A B represent the handles, and C the chain, of a policeman's nipper.

In carrying out my invention in the form shown in the drawings, I form one handle, A, for instance, with a T-shaped groove or recess, the portion $a$ of which is created in the outer edge of the body of such handle, while the portion $b$ is in one side of the shank thereof, and I form the opposite handle, B, of sufficiently less size to enter the said T-shaped recess $a\ b$, as shown in Fig. 1.

After passing the chain about a prisoner's wrist, the officer inserts the lesser handle B in the recess in the handle A, and then twists the chain to the desired degree, the two handles becoming practically one so far as being confined together and avoiding gripping of the flesh of the officer's hand are concerned.

What I claim is—

In police-nippers, the T-shaped handle A, provided with the recess $a\ b$, in combination with the handle B, fitting within said recess, substantially as described.

In testimony whereof I affix my signature in presence of two witnesses.

EDWARD DAVIS BEAN.

Witnesses:
H. E. LODGE,
F. CURTIS.